United States Patent
Brown

(10) Patent No.: US 8,742,610 B2
(45) Date of Patent: Jun. 3, 2014

(54) WIND TURBINE SYSTEM AND METHOD OF OPERATING A WIND TURBINE SYSTEM

(71) Applicant: Wind Energy Corporation, Elizabethtown, KY (US)

(72) Inventor: Sean Patrick Brown, Holland, OH (US)

(73) Assignee: Wind Energy Corporation, Elizabethtown, KY (US)

( * ) Notice: Subject to any disclaimer, the term of this patent is extended or adjusted under 35 U.S.C. 154(b) by 0 days.

(21) Appl. No.: 13/886,803

(22) Filed: May 3, 2013

(65) Prior Publication Data

US 2013/0292943 A1    Nov. 7, 2013

Related U.S. Application Data

(60) Provisional application No. 61/642,675, filed on May 4, 2012.

(51) Int. Cl.

| | |
|---|---|
| F03D 9/00 | (2006.01) |
| H02P 9/04 | (2006.01) |
| F03D 7/02 | (2006.01) |
| H02P 9/00 | (2006.01) |
| F03D 3/00 | (2006.01) |
| F03D 1/00 | (2006.01) |
| F03D 7/00 | (2006.01) |

(52) U.S. Cl.
CPC ............. *F03D 7/02* (2013.01); *F03D 7/0244* (2013.01); *F03D 9/002* (2013.01); *F03D 9/00* (2013.01); *Y02E 10/723* (2013.01); *Y02E 10/725* (2013.01); *H02P 2009/004* (2013.01); *Y02E 10/72* (2013.01); *F03D 9/003* (2013.01); *F03D 3/005* (2013.01); *F03D 1/00* (2013.01); *F03D 7/00* (2013.01)
USPC ........................................................ 290/44

(58) Field of Classification Search
CPC ......... F03D 7/0244; F03D 9/002; F03D 7/02; F03D 9/00; F03D 9/003; F03D 3/005; F03D 1/00; F03D 7/00; Y02E 10/723; Y02E 10/725; Y02E 10/72; H02P 2009/004
USPC .......................................... 290/44, 43, 55, 54
See application file for complete search history.

(56) References Cited

U.S. PATENT DOCUMENTS

| | | | |
|---|---|---|---|
| 4,331,881 A | 5/1982 | Soderholm et al. | |
| 4,333,018 A | 6/1982 | Bottrell | |

(Continued)

FOREIGN PATENT DOCUMENTS

| | | |
|---|---|---|
| CA | 2651594 A1 | 11/2007 |
| CA | 2786909 A1 | 8/2011 |

(Continued)

OTHER PUBLICATIONS

ISA/KR, International Search Report and Written Opinion issued in related international application No. PCT/US2013/039488, completed Aug. 20, 2013.

*Primary Examiner* — Javaid Nasri
(74) *Attorney, Agent, or Firm* — Stites & Harbison, PLLC; Jeffrey A. Haeberlin; David W. Nagle, Jr.

(57) ABSTRACT

A method of operating a wind turbine system includes: determining, by an industrial process controller, if an actual wind speed value, received from an anemometer, of a wind at a location of the wind turbine system is less than a predetermined minimum wind speed value. If so, then calculating a command speed value that will cause a variable-speed drive to drive the motor/generator and a sail assembly at a speed that the sail assembly would turn if the actual wind speed value was the minimum wind speed value, such that the sail assembly turns and provides a visual effect. If not, then calculating a command speed value based on the actual wind speed value such that the variable-speed drive and the motor/generator will operate in a braking mode to recover a braking energy of a load of the wind on the sail assembly.

14 Claims, 11 Drawing Sheets

(56) References Cited

U.S. PATENT DOCUMENTS

| | | |
|---|---|---|
| 4,613,762 A | 9/1986 | Soderholm |
| 5,155,375 A | 10/1992 | Holley |
| 5,252,029 A | 10/1993 | Barnes |
| 5,503,525 A | 4/1996 | Brown et al. |
| 6,809,431 B1 | 10/2004 | Schippmann |
| 6,847,128 B2 | 1/2005 | Mikhail et al. |
| 7,118,338 B2 | 10/2006 | Moroz et al. |
| 7,352,076 B1 | 4/2008 | Gabrys |
| 7,763,989 B2 | 7/2010 | Kinzie et al. |
| 7,863,767 B2 | 1/2011 | Chapple et al. |
| 7,945,350 B2 | 5/2011 | Kinzie et al. |
| 8,084,874 B2 | 12/2011 | Llorente Gonzalez |
| 8,120,194 B2 | 2/2012 | Hoffmann et al. |
| 8,128,361 B2 | 3/2012 | Dawson et al. |
| 8,294,288 B2 | 10/2012 | Rivas et al. |
| 8,360,724 B2 | 1/2013 | Yoshida |
| 2009/0001724 A1 | 1/2009 | Lee et al. |
| 2011/0038726 A1 | 2/2011 | Elkin et al. |
| 2011/0215738 A1* | 9/2011 | Kamen et al. ............ 315/302 |

FOREIGN PATENT DOCUMENTS

| | | |
|---|---|---|
| CA | 2793281 A1 | 9/2011 |
| EP | 1918581 A2 | 5/2008 |
| EP | 2386750 A1 | 11/2011 |
| EP | 2479426 A1 | 7/2012 |
| GB | 2475609 A | 5/2011 |
| JP | 2005240725 | 9/2005 |
| JP | 2011064110 A | 3/2011 |
| JP | 2011078186 A | 4/2011 |
| WO | 2007129907 A3 | 11/2007 |
| WO | 2010003955 A2 | 1/2010 |
| WO | 2011-084154 A1 | 7/2011 |
| WO | 2011-109611 A1 | 9/2011 |
| WO | 2011117246 A3 | 9/2011 |
| WO | 2011-126961 A1 | 10/2011 |
| WO | 2011-150942 A1 | 12/2011 |
| WO | 2012025121 A2 | 3/2012 |

* cited by examiner

WIND TURBINE SYSTEM AND METHOD OF OPERATING A WIND TURBINE SYSTEM

CROSS-REFERENCE TO RELATED APPLICATIONS

This application claims priority to U.S. Provisional Patent Application No. 61/642,675, filed May 4, 2012, the entire disclosure of which is incorporated herein by reference.

BACKGROUND OF THE INVENTION

1. Field of the Invention

The present invention relates to a wind turbine system and method of operating a wind turbine system. More particularly, the present invention relates to a method and system for operating a vertical-axis wind turbine.

2. Description of the Related Art

A wind turbine or windmill converts the kinetic energy in wind into electric energy. There are two general types or categories of wind turbines: horizontal-axis wind turbines and vertical-axis wind turbines. As the terms imply, a horizontal-axis wind turbine includes a sail or one or more blades that rotates about a horizontal axis, while a vertical-axis wind turbine includes a sail or one or more blades that rotates about a vertical axis.

Since horizontal-axis wind turbines must be pointed into the wind, they are ineffective in locations where wind directions are highly variable. Because vertical-axis wind turbines do not suffer from this same deficiency, they are appropriate for installation on top of buildings and similar locations where the wind directions are variable.

BRIEF SUMMARY OF THE INVENTION

In accordance with one aspect of the invention, a method of operating a wind turbine system includes determining, by an industrial process controller, if an actual wind speed value, received from an anemometer, of a wind at a location of the wind turbine system is less than a predetermined minimum wind speed value. If so, then the method includes calculating a command speed value that will cause a variable-speed drive in communication with a motor/generator of the wind turbine system to drive the motor/generator and a sail assembly attached to the motor/generator at a speed that the sail assembly would turn if the actual wind speed value was the minimum wind speed value, such that the sail assembly turns and provides a visual effect. If not, then the method includes calculating a command speed value based on the actual wind speed value such that the variable-speed drive and the motor/generator will operate in a braking mode to recover a braking energy of a load of the wind on the sail assembly. Lastly, the method includes sending the command speed value to the variable-speed drive.

In one implementation, the step of calculating a command speed based on the actual wind speed value further includes defining a range of command speed values that will cause the motor/generator and sail assembly to turn at a range of speeds that cause harmonic frequencies in a structure supporting the motor/generator and the sail assembly. If the calculated command speed value falls in the defined range, then the method includes setting the command speed value to a speed below the defined range.

In another implementation, the method of operating a wind turbine system further includes, before determining if the actual wind speed value is less than the predetermined minimum wind speed value, determining, by the industrial process controller, that an ambient air temperature value, received from a thermometer, of air at the location of the wind turbine system is less than a predetermined snow accumulation air temperature value. If the wind turbine system has also been in a stand-by mode of no operation for more than a predetermined snow accumulation time period, then the method includes: sending a predetermined snow removal command speed value to the variable-speed drive to turn the sail assembly via the motor/generator; maintaining a speed of the motor/generator above a predetermined minimum snow removal speed for a predetermined minimum snow removal time; and sending a command speed value of zero to stop the motor/generator and the sail assembly.

In yet another implementation, power produced by the motor/generator has a form of a variable frequency AC signal. The method then includes: inputting the variable frequency AC signal into a rectifier to produce a rectified signal; inputting the rectified signal into an AC-to-DC converter to produce a DC signal; inputting the DC signal into an isolation transformer to produce a transformed DC signal having a voltage above zero volts; and inputting the transformed DC signal into a photo-voltaic inverter to produce an AC power signal that can be returned to a power system.

In still yet another implementation, the method of operating a wind turbine system further includes: before determining if the actual wind speed value is less than the predetermined minimum wind speed value, entering a stand-by mode of no operation; determining, by the industrial process controller, that there are no system fault or trip alarms for the wind turbine system; determining that the wind turbine system has been powered up for more than a predetermined startup time period; entering one of an economy mode or a continuous mode of operation; enabling the variable-speed drive and reading that the variable-speed drive is enabled; releasing a brake assembly applying a braking force on rotation of the sail assembly; and reading that the brake assembly is released. The economy mode includes: determining that an average wind speed value over a predetermined monitoring period exceeds a predetermined start value before enabling the variable-speed drive; and, upon determining that the average wind speed value over the predetermined monitoring period is less than a predetermined stop value, overriding the calculated command speed value to stop rotation of the sail assembly, engaging the brake assembly, and reading that the brake assembly is engaged. The continuous mode of operation includes operating the wind turbine system until a request is received to go to the stand-by mode.

In accordance with another aspect of the invention, a method of operating a wind turbine system includes: determining, by an industrial process controller, if an ambient air temperature value, received from a thermometer, of air at a location of the wind turbine system is less than a predetermined snow accumulation air temperature value, and if the wind turbine system has been in a stand-by mode of no operation for more than a predetermined snow accumulation time period. If so, then the method includes: sending a predetermined snow removal command speed value to a variable-speed drive to drive a motor/generator and a sail assembly attached to the motor/generator to turn the sail assembly; maintaining a speed of the motor/generator above a predetermined minimum snow removal speed for a predetermined minimum snow removal time; and sending a command speed value of zero to stop the variable-speed drive to stop turning the sail assembly via the motor/generator.

In one implementation, the method of operating a wind turbine system further includes: determining, by the industrial process controller, if an actual wind speed value, received from an anemometer, of a wind at the location of the wind turbine system is less than a predetermined minimum wind speed value. If so, then the method includes calculating a command speed value that will cause the variable-speed drive to drive the motor/generator and the sail assembly at a speed that the sail assembly would turn if the actual wind speed value was the minimum wind speed value, such that the sail assembly turns and provides a visual effect. If not, then the method includes calculating a command speed value based on the actual wind speed value such that the variable-speed drive and the motor/generator will operate in a braking mode to recover a braking energy of a load of the wind on the sail assembly. Lastly, the method includes sending the command speed value to the variable-speed drive.

The step of calculating a command speed based on the actual wind speed value may further include defining a range of command speed values that will cause the motor/generator and sail assembly to turn at a range of speeds that cause harmonic frequencies in a structure supporting the motor/generator and the sail assembly. If the calculated command speed value falls in the defined range, then the method may include setting the command speed value to a speed below the defined range, in order to prevent operation of the motor/generator and sail assembly at the speed that cause harmonic frequencies in the support structure.

The power produced by the motor/generator may a form of a variable frequency AC signal. In this case, the method may further include: inputting the variable frequency AC signal into a rectifier to produce a rectified signal; inputting the rectified signal into an AC-to-DC converter to produce a DC signal; inputting the DC signal into an isolation transformer to produce a transformed DC signal having a voltage above zero volts; and inputting the transformed DC signal into a photo-voltaic inverter to produce an AC power signal that can be returned to a power system.

According to yet another aspect of the invention, a wind turbine system includes: a motor/generator; a variable-speed drive operably connected to the motor/generator; a sail assembly mounted to a shaft, the shaft operably connected to the motor/generator; an anemometer for measuring an actual wind speed value of a wind at a location of the sail assembly; an industrial process controller including a data storage device, a processing device in communication with the data storage device, and an input/output (I/O) interface device in communication with the processing device, the variable-speed drive, and the anemometer. The data storage device includes computer-readable instructions for execution by the processing device to cause the industrial process controller to determine if the actual wind speed value is less than a predetermined minimum wind speed value. If so, then to cause the industrial process controller to calculate a command speed value that will cause the variable-speed drive to drive the motor/generator and the sail assembly attached to the motor/generator at a speed that the sail assembly would turn if the actual wind speed value was the minimum wind speed value, such that the sail assembly turns and provides a visual effect. If not, then to cause the industrial process controller to calculate a command speed value based on the actual wind speed value such that the variable-speed drive and the motor/generator will operate in a braking mode to recover a braking energy of a load of the wind on the sail assembly. Then, the computer-readable instructions for execution by the processing device cause the industrial process controller to send the command speed value to the variable-speed drive.

In one implementation, the computer-readable instructions include a range of command speed values that will cause the motor/generator and sail assembly to turn at a range of speeds that cause harmonic frequencies in a structure supporting the motor/generator and the sail assembly. The computer-readable instructions then cause the processing device to determine if the calculated command speed value falls in the defined range, and, if so, to set the command speed value to a speed below the defined range.

In another implementation, the wind turbine system further includes a thermometer for measuring a temperature value at the location of the sail assembly, the thermometer in communication with the I/O interface device, and computer-readable instructions for execution by the processing device to cause the industrial process controller to: before determining if the actual wind speed value is less than the predetermined minimum wind speed value, determine that an ambient air temperature value, received from the thermometer, is less than a predetermined snow accumulation air temperature value, and that the wind turbine system has been in a stand-by mode of no operation for more than a predetermined snow accumulation time period. The computer-readable instructions for execution by the processing device then cause the industrial process controller to: send a predetermined snow removal command speed value to the variable-speed drive to turn the sail assembly via the motor/generator; maintain a speed of the motor/generator above a predetermined minimum snow removal speed for a predetermined minimum snow removal time; and send a command speed value of zero to stop the motor/generator and the sail assembly.

In yet another implementation, the wind turbine system further includes: a rectifier for receiving a generated variable frequency AC signal produced by the motor/generator, and producing a rectified signal; an AC-to-DC converter receiving the rectified signal and producing a DC signal; an isolation transformer receiving the DC signal and producing a transformed DC signal having a voltage above zero volts; and a photo-voltaic inverter receiving the transformed DC signal and producing an AC power signal that can be returned to a power system.

In still yet another implementation, the wind turbine system further includes: a brake assembly applying a braking force on rotation of the sail assembly; and computer-readable instructions for execution by the processing device to cause the industrial process controller to: before determining if the actual wind speed value is less than the predetermined minimum wind speed value, enter a stand-by mode of no operation; determine that there are no system fault or trip alarms for the wind turbine system; determine that the wind turbine system has been powered up for more than a predetermined startup time period; enter one of an economy mode or a continuous mode of operation; enable the variable-speed drive and read that the variable-speed drive is enabled; release the brake assembly, and read that the brake assembly is released. When in the economy mode, the computer-readable instructions cause the industrial process controller to: determine that an average wind speed value over a predetermined monitoring period exceeds a predetermined start value before enabling the variable-speed drive; upon determining that the average wind speed value over the predetermined monitoring period is less than a predetermined stop value, override the calculated command speed value to stop rotation of the sail assembly, engage the brake assembly, and read that the brake assembly is engaged. When in the continuous mode, the computer-readable instructions cause the industrial process controller to operate the wind turbine system until a request is received to go to the stand-by mode.

DETAILED DESCRIPTION OF EXEMPLARY EMBODIMENTS OF THE INVENTION

Figure 1:
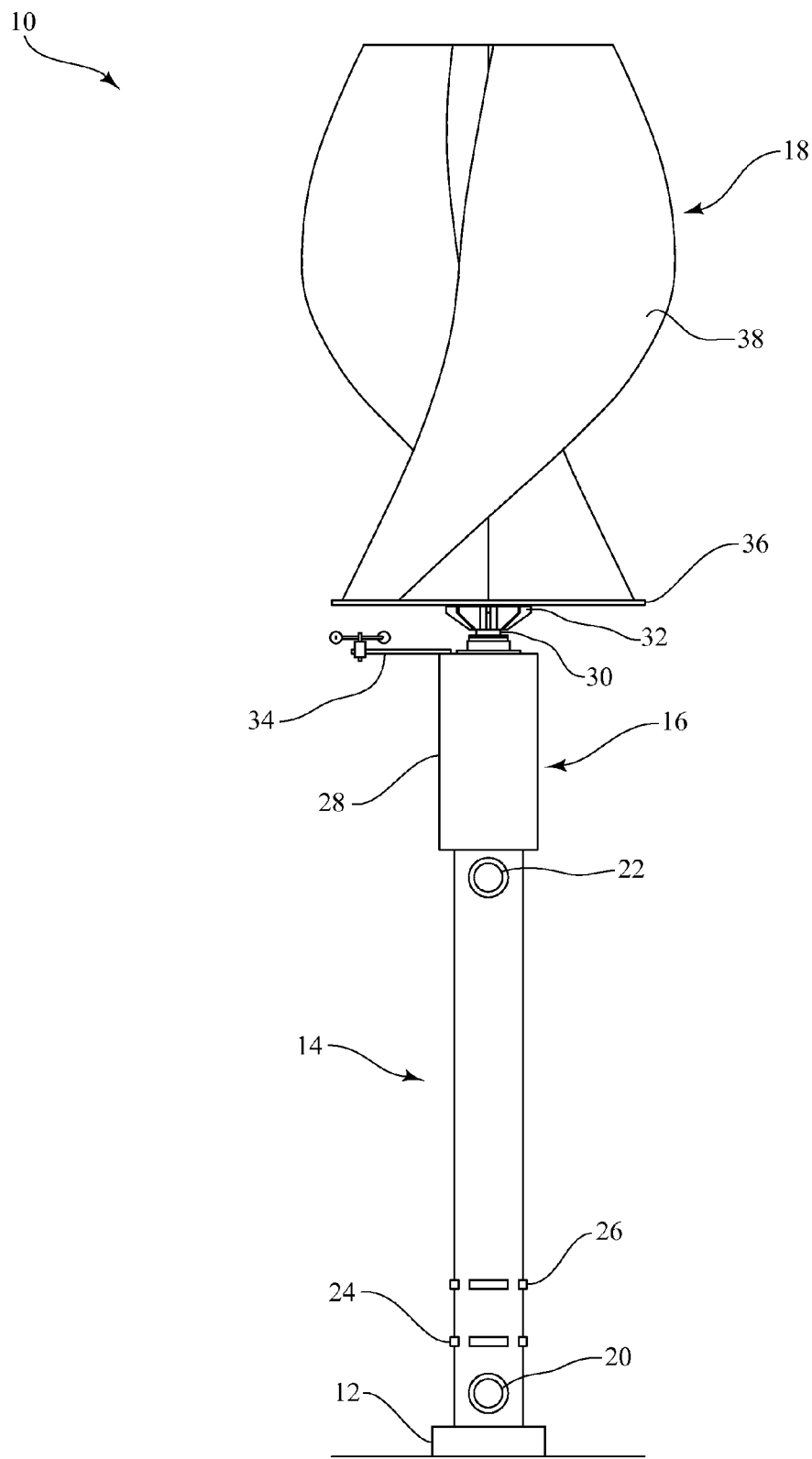
FIG. 1 is an elevation view of an exemplary wind turbine according to an embodiment of the invention.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the following terms are believed to be well understood by one of ordinary skill in the art, definitions are set forth to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims. Thus, for example, reference to "a signal line" includes a plurality of such lines, and so forth.

Unless otherwise indicated, all numbers expressing dimensions, properties such as characteristics of materials, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to make and use the disclosed invention.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The term "processing device" is used herein to describe one or more microprocessors, microcontrollers, central processing units, Digital Signal Processors (DSPs), Field-Programmable Gate Arrays (FPGAs), Application-Specific Integrated Circuits (ASICs), or the like for executing instructions stored on a data storage device.

The term "data storage device" is understood to mean physical devices (computer readable media) used to store programs (sequences of instructions) or data (e.g. program state information) on a non-transient basis for use in a computer or other digital electronic device, including primary memory used for the information in physical systems which are fast (i.e. RAM), and secondary memory, which are physical devices for program and data storage which are slow to access but offer higher memory capacity. Traditional secondary memory includes tape, magnetic disks and optical discs (CD-ROM and DVD-ROM). The term "memory" is often (but not always) associated with addressable semiconductor memory, i.e. integrated circuits consisting of silicon-based transistors, used, for example, as primary memory but also other purposes in computers and other digital electronic devices. Semiconductor memory includes both volatile and non-volatile memory. Examples of non-volatile memory include flash memory (sometimes used as secondary, sometimes primary computer memory) and ROM/PROM/EPROM/EEPROM memory. Examples of volatile memory include dynamic RAM memory, DRAM, and static RAM memory, SRAM.

The terms "electrical communication" and "electrical signal communication" are understood to mean all forms of communication electrical signals, including power and data signals, by any and all electrical, electronic, and electromagnetic means, including wired and wireless communications.

FIG. 1 is an elevation view of an exemplary wind turbine 10 according to an exemplary embodiment of the invention. The exemplary wind turbine 10 generally includes a pier 12, a mast structure 14, a gear box unit 16, and a sail assembly 18.

The pier 12 extends below grade in order to serve as a foundation for the remaining elements of the exemplary wind turbine 10. The details of the pier 12, such as shape, size, construction, materials, and electrical and mechanical connections are substantially a matter of design choice for one of ordinary skill in the art, and this description of the pier 12 is provided primarily for completeness of the description. As a non-limiting example, the pier 12 may be made of a reinforced concrete material and may have a diameter of approximately 4'-0" and extend approximately 25'-0" below grade and 1'-0" above grade.

Likewise, the details of the mast structure 14, which is secured to the pier 12 for supporting the gear box unit 16 and sail assembly 18 a safe and effective distance above the grade, such as shape, size, construction, materials, and electrical and mechanical connections, are also substantially a matter of design choice for one of ordinary skill in the art. As a non-limiting example, the mast structure 14 may be made of a structural steel material and may have an outer diameter of approximately 2'-6" and extend approximately 20'-2" above to top of the pier 12. 12" diameter access holes 20, 22 may be provided near the bottom and top of the mast structure 14 for wiring installation. Electrical panel brackets 24, 26 may be provided for the installation of electrical panels (not shown).

The gear box unit 16 is secured to the top of the mast structure 14, and includes a housing 28, a shaft 30, a sail support bracket 32, and an anemometer assembly 34. As a non-limiting example, the gear box unit 16 may extend approximately 8'-8" above to top of the mast structure 14.

The sail assembly 18 is attached to the sail support bracket 32 at the top of the gear box unit 16, and includes a sail bottom platen 36, and a vertical-axis wind sail 38. As a non-limiting example, the sail assembly 18 may have a diameter of approximately 13'-2½" and extend approximately 19'-8" above to top of the gear box unit 16.

Figure 2:
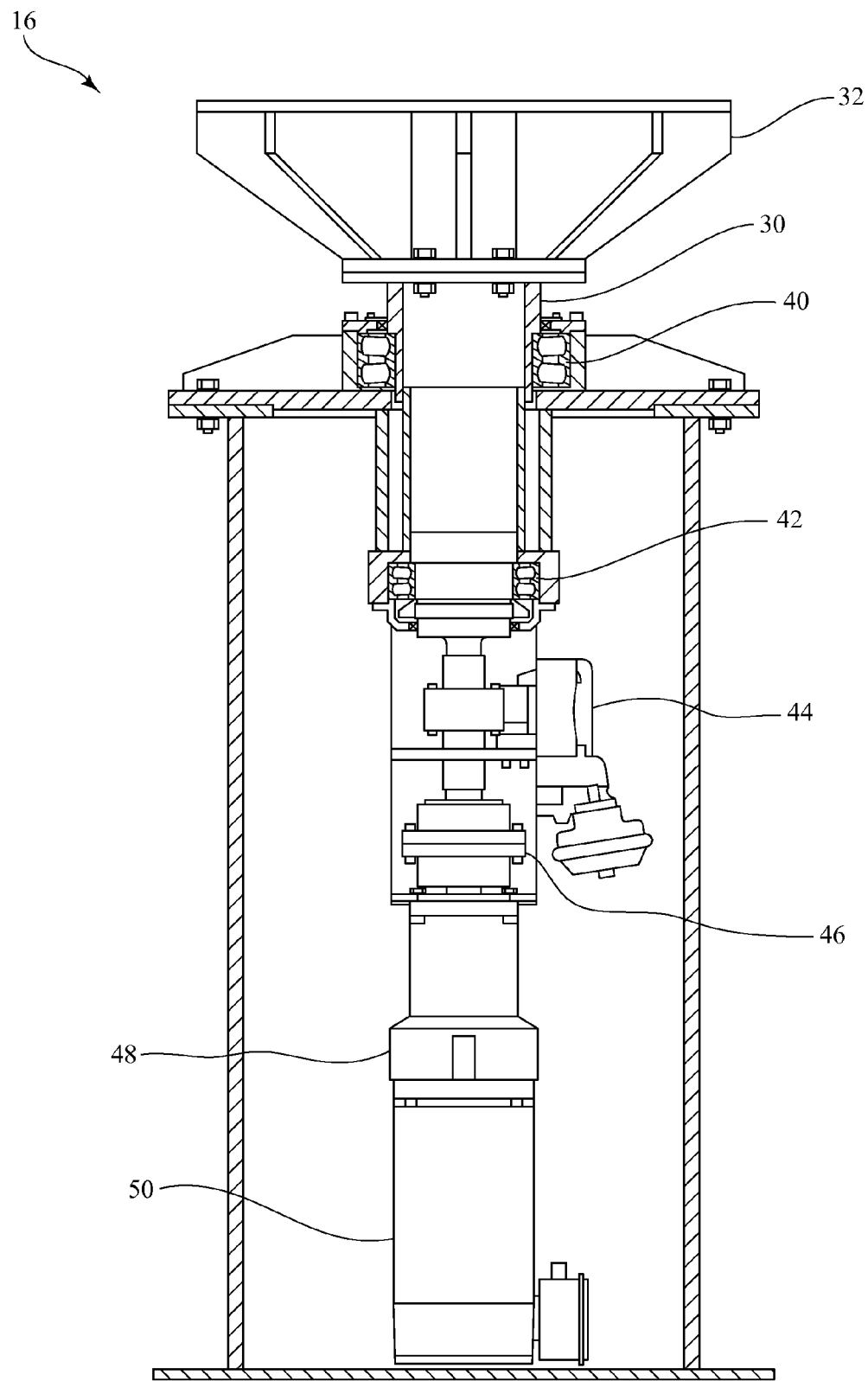
FIG. 2 is a partial sectional view of the gear box unit of the exemplary wind turbine of FIG. 1.

FIG. 2 is a partial sectional view of the gear box unit 16, including the sail support bracket 32, the shaft 30, roller bearings 40, 42, a brake assembly 44, a gear coupling 46, a gearbox 48, and a motor/generator 50. The components are operably connected as shown in FIG. 2. As non-limiting examples, the roller bearings 40 may be FAG™ brand spherical roller bearings, 240 mm I.D., 360 mm O.D., 92 mm wide, sealed and greased. The roller bearings 42 may be FAG™ brand spherical roller bearings, 170 mm I.D., 260 mm O.D., 67 mm wide, sealed and greased, manufactured by Schaeffler Technologies AG & Co. KG, of Schweinfurt, Germany. The brake assembly 44 may be a WABCO™ brand caliper disc brake, spring applied/air released with a type 20 brake chamber, manufactured by WABCO (WABCO Holdings Inc. of Piscataway, N.J.). The gear coupling 46 may be a Falk™ brand type G20 gear coupling, 2.7490/2.7480 bore W/0.625× 0.312 KWY one half, 2.1635/2.1640 bore W/0.500×0.250 KWY other half, or equal, as manufactured by Rexnord Corporation, of Milwaukee, Wis. The gearbox 48 may be an Anaheim Automation™ brand custom planetary gearbox, 70:1 ratio, NEMA mount, special order, NCNR, 265 mm B.C., 38.018 mm shaft dia., 230.016 mm pilot dia., 14.93 mm hole dia., 4 mm pilot thk, 80.0 mm shaft length, as manufactured by Anaheim Automation, Inc. of Anaheim, Calif. The motor/generator 50 may be a Baldor™ brand BSM132C-5200 servo motor manufactured and distributed by Baldor Electric Company of Fort Smith, Ark.

Figure 3:
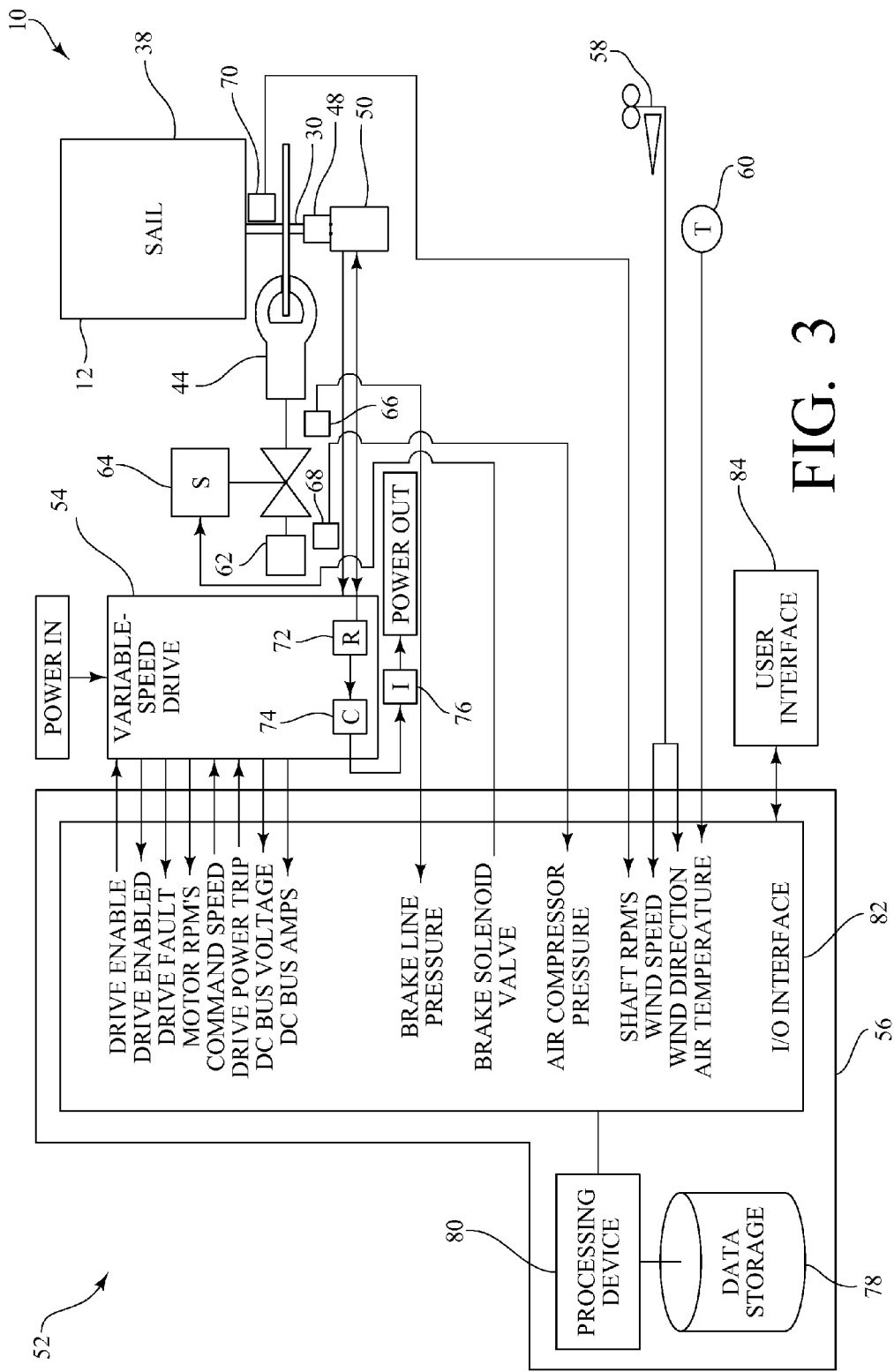
FIG. 3 is a functional block diagram of the primary components of an exemplary wind turbine system in accordance with the present invention.

FIG. 3 is a functional block diagram of the primary components of an exemplary wind turbine system 52 in accordance with the present invention, including: the exemplary wind turbine 10 previously described; a variable-speed drive 54 (also known as a variable-frequency drive, adjustable-frequency drive, AC drive, micro drive, or inverter drive) in electrical communication with the motor/generator 50 of the wind turbine 10; and an industrial process controller 56 in electrical signal communication with the variable-speed drive 54 and components of the wind turbine 10 as described below.

In addition to the components previously described, in this exemplary embodiment the wind turbine 10 also includes an anemometer 58 as a component of the anemometer assembly 34, a thermometer 60, an air compressor 62, a solenoid valve 64, a brake line pressure sensor 66, an air compressor pressure sensor 68, and a shaft RPM sensor 70. The anemometer 58, the thermometer 60, the solenoid valve 64, the brake line pressure sensor 66, the air compressor pressure sensor 68, and the shaft RPM sensor 70 are in electrical signal communication with the industrial process controller 56.

The anemometer 58 is for detecting a wind speed value and a wind direction value at the location of the wind turbine 10. As a non-limiting example, the anemometer 58 may be a Kriwan™ brand model INT10 Anemometer, 0-50 m/s; 4-20 mA, part number 13 N 219 S50, as manufactured by KRIWAN Industrie-Elektronik GmbH of Forchtenberg, Germany.

The thermometer 60 (or thermocouple) is for detecting an ambient air temperature value at the location of the wind turbine 10.

The air compressor 62 is for compressing air and maintaining an integral surge tank at a set pressure. The solenoid valve 64 is in flow communication between the air compressor 62 and the brake assembly 44. Switching the solenoid valve 64 from a closed position to an open position applies compressed air to the brake assembly 44, causing release of the braking action of the brake assembly 44 on the rotation of the shaft 30 and, therefore, the sail assembly 18. The brake line pressure sensor 66 confirms to the industrial process controller 56 that the solenoid valve 64 is open and compressed air is applied to the brake assembly 44.

As mentioned above, the variable-speed drive 54 is in electrical communication with the motor/generator 50 of the wind turbine 10. One suitable variable-speed drive 54 for use with the present invention is a DigiFlex® Performance™ Servo Drive Model No. DPRAHIR-100A400A manufactured and distributed by Advanced Motion Controls of Camarillo, Calif. Advantageously, for a determined wind speed value, the industrial process controller 56 signals the variable-speed drive 54 to set the command speed of the motor/generator 50 to turn the sail 38 at a speed that is less than the sail 38 would turn naturally at such a determined wind speed value and, therefore, operate in a braking mode. As is known, the variable-speed drive 54 is thereby able to recover the braking energy of the load on the motor/generator 50 moving faster than the command speed (i.e., an overhauling load) and return it as power. Please note that the "braking mode" and "braking energy" of the variable-speed drive 54 are different and distinct from a braking function of the brake assembly 44, described in more detail below.

The power produced by the motor/generator 50 has the form of a variable frequency AC signal. However, this variable frequency AC signal is input into a rectifier 72 and then an AC-to-DC converter 74 to produce a DC signal. The rectifier 72 and the AC-to-DC converter are integral to the variable-speed drive 54. The DC power signal is then input into an inverter 76 to produce an AC power signal that can be returned to the power system (e.g., a 120 VAC, 60 Hz power signal). One suitable inverter 76 is a Sunny Boy™ brand solar inverter Model SU7000US-12, manufactured by SMA America, LLC of Rocklin, Calif.

Normally, a wind energy rectifier produces a DC signal which is, for instance, 330 volts DC, but is actually +165 volts and −165 volts. If such a signal is input to a solar inverter, the solar inverter will interpret the −165 volts as a dead short and shut itself down. However, by running the DC signal through an isolation transformer to transform the DC signal to zero volts and +330 volts, an inverter of the type normally used for photo-voltaic arrays (i.e., solar cells) may be used to produce an AC power signal that can be returned to the power system, e.g., "the electrical power grid" that delivers electricity from suppliers (power generators) to customers (power consumers). Thus, the exemplary wind turbine system 52 has the ability to work in combination with solar cells. This ability is a function of the fact the DC current signal coming from the variable-speed drive 54 is exactly the same as a DC current signal coming from a photo-voltaic array. Therefore, the DC current signal coming from the variable-speed drive 54 can be input into a photo-voltaic array inverter to produce an AC power signal that can be returned to the power system.

The industrial process controller 56 includes a data storage device 78, a processing device 80 in communication with the data storage device 78, and an input/output (I/O) interface device 82 in communication with the processing device 80.

The industrial process controller 56 also includes a user interface 84, such as a keyboard, monitor, and mouse, a terminal, or a touchscreen, or any other means of receiving input from and providing output to a user. Computer-readable instructions (i.e., software) are stored on the data storage device 78 and executed by the processing device 80 in order to cause the industrial process controller 56 to implement the functions and routines via the I/O interface device 82, as described below. Therefore, the industrial process controller 56 is a unique machine that cooperates with the other components of the wind turbine system 52 to function according to the instructions stored on the data storage device 78.

The exemplary wind turbine system 53 has three basic operating modes: a stand-by mode, an economy mode, and a continuous mode. In the stand-by mode, the sail assembly 18 (FIG. 1) is stopped and the brake assembly 44 (FIG. 2) is engaged. In the economy mode, the sail assembly 18 (FIG. 1) will stop turning when the wind falls below a first threshold speed for a first predetermined amount of time, and will not start turning again until the wind rises above a second threshold speed for a second predetermined amount of time. In the continuous mode, the sail assembly 18 (FIG. 1) will always turn at least at a minimal speed, even if the wind dies completely, to provide a visual effect (e.g., as with a rotating sign). The economy mode and the continuous mode can only be entered from the stand-by mode.

FIGS. 4-8 and 10-11 show an exemplary flow of a control logic of an exemplary industrial process controller 56 according to the invention.

Figure 4:
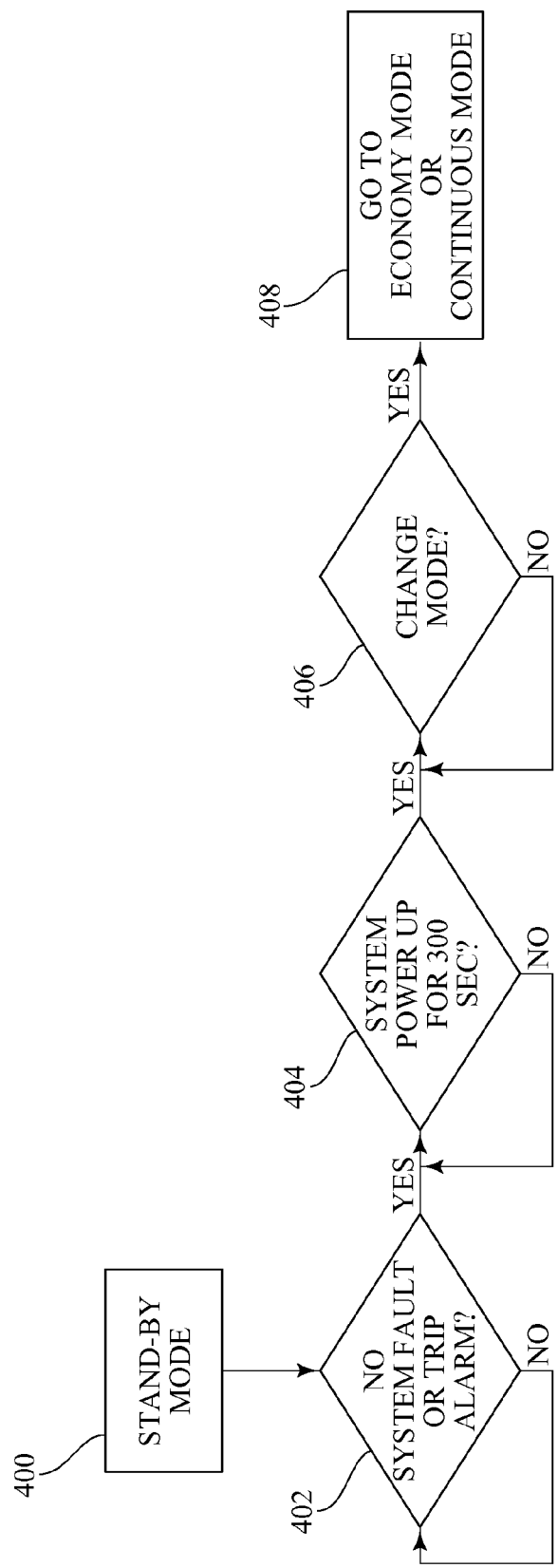
FIGS. 4-8 show an exemplary flow of a control logic of an exemplary industrial process controller in accordance with the present invention.

FIG. 4 is a flow chart of steps executed by a stand-by mode routine or module 400 of computer-readable instructions executed by the processing device 80. Step 402 is determining, using data received via the I/O interface device 82 (e.g., "DRIVE FAULT," "DRIVE POWER TRIP," and "HIGH SPEED TRIP," as shown in FIG. 3) whether there are system faults or trip alarms. If so, then the execution of instructions will not proceed until such system faults or trip alarms are cleared. If there are no system faults or trip alarms, then step 404 is determining whether the system has been powered up for a predetermined startup period (e.g., 300 seconds). If not, then the execution of instructions will not proceed until the wind turbine system 52 has been powered up for 300 seconds. If so, then step 406 is determining whether a user, via the user interface 84, has requested a change to the economy mode or the continuous mode of operation. If not, then the execution of instructions will not proceed until a user has requested a change to the economy mode or the continuous mode of operation. If so, then step 408 is going to either the economy mode routine or the continuous mode routine, as described below.

Figure 5:
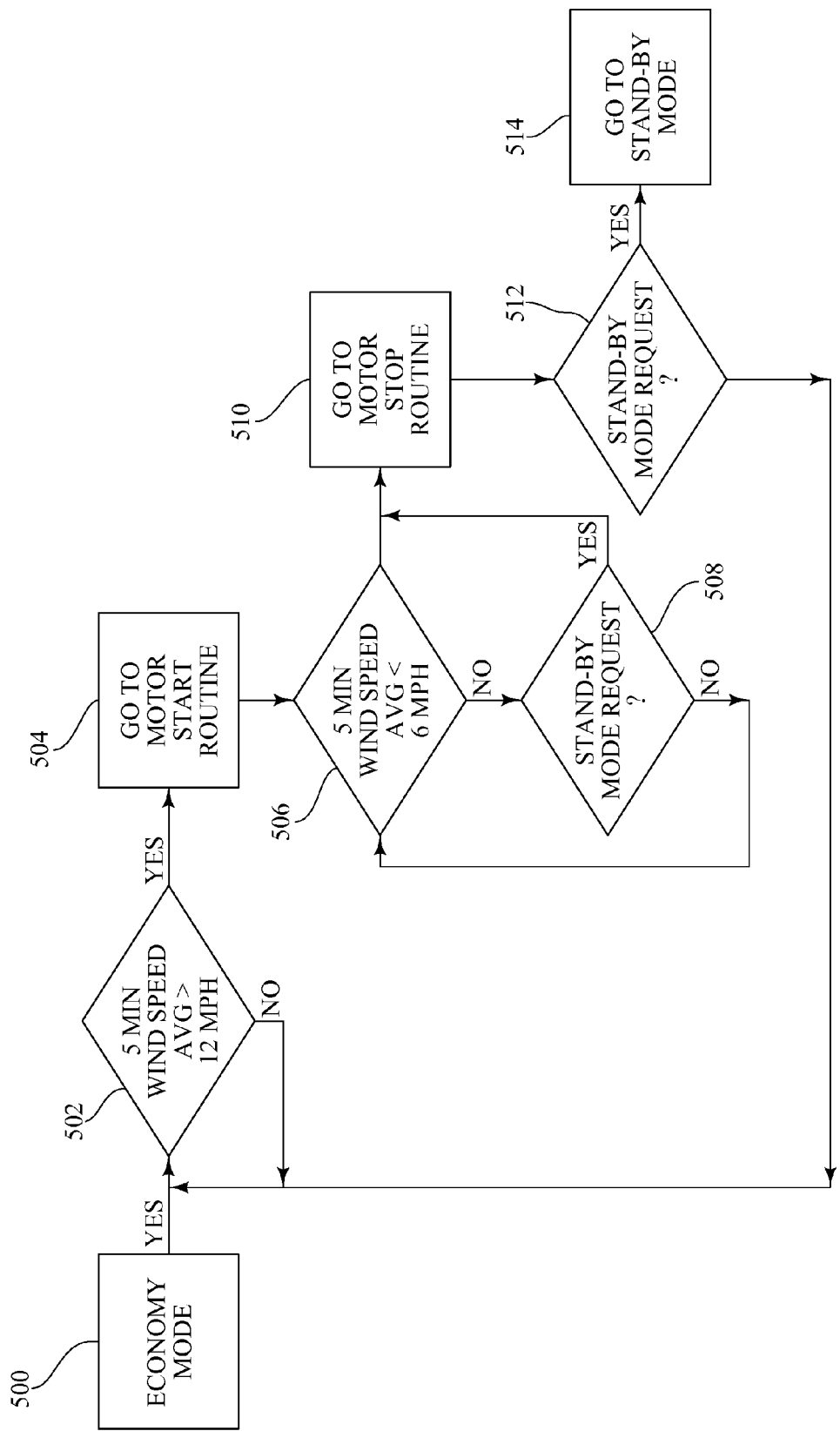

FIG. 5 is a flow chart of steps executed by an economy mode routine or module 500 of computer-readable instructions executed by the processing device 80. Step 502 is determining whether a five-minute wind speed average is greater than a predetermined start value (e.g., 12 miles per hour (MPH)). This determination is made by the processing device 80 using data from the anemometer 58 received by the I/O interface device 82 of the industrial process controller 56 (FIG. 3). It is noted that this determination is related to step 404 of determining whether the wind turbine system 52 has been powered up for 300 seconds (i.e., five minutes). If the five-minute wind speed average is not greater than the predetermined start value, then the execution of instructions will not proceed until the five-minute wind speed average is greater than the predetermined start value. If the five-minute wind speed average is greater than the predetermined start value, then step 504 is going to a motor start routine, as described below.

Figure 6:
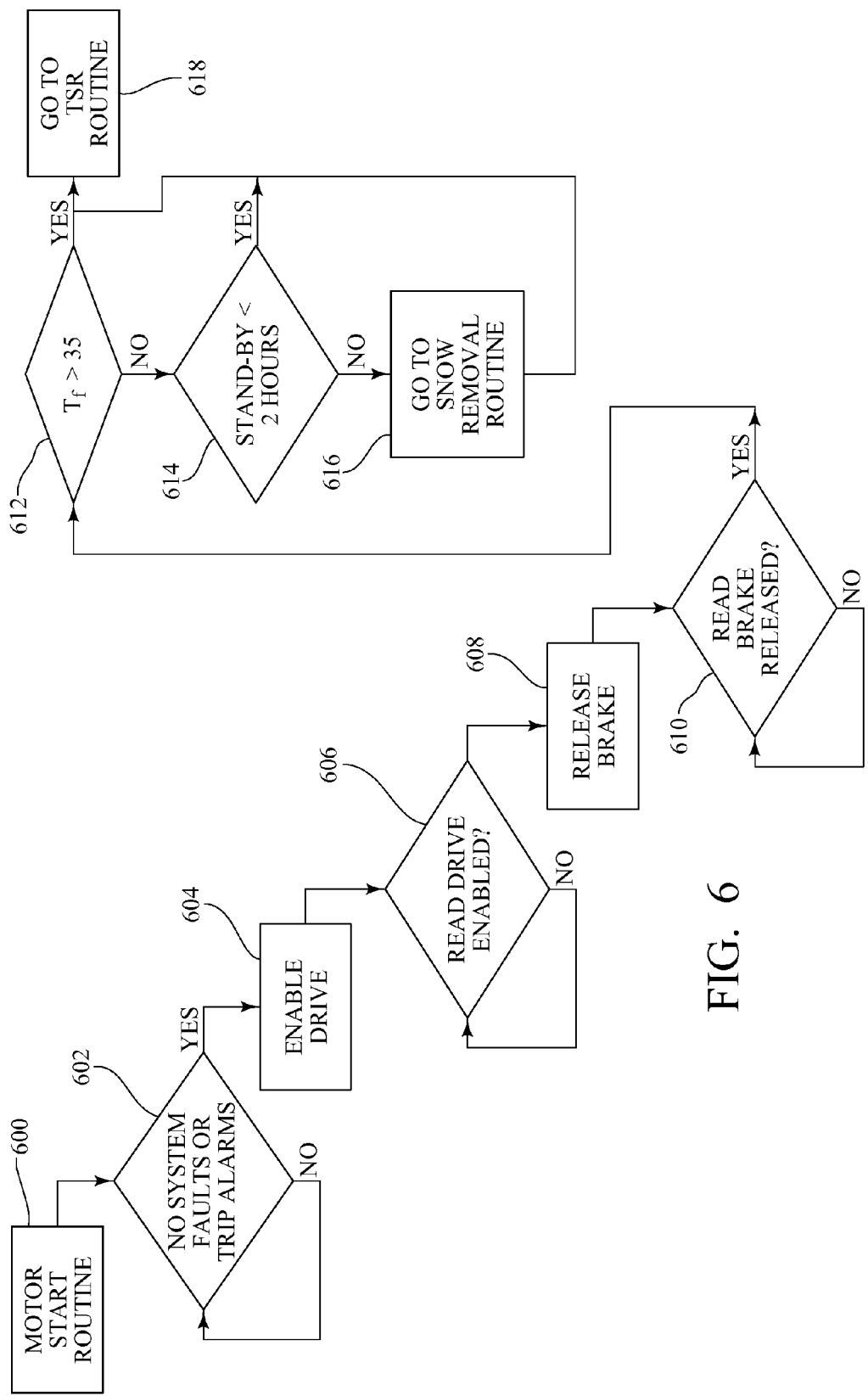

FIG. 6 is a flow chart of steps executed by a motor start routine or module 600 of computer-readable instructions executed by the processing device 80. In the motor start subroutine 600, the industrial process controller 40 determines in step 602 that no system faults or trip alarms exist. Step 604 is enabling the variable-speed drive 54, and step 606 is reading that the variable-speed drive 54 is enabled via the I/O interface device 82 (see: "DRIVE ENABLE" output and "DRIVE ENABLED" input shown in FIG. 3). Step 608 is releasing braking force of the brake assembly 44, and step 610 is reading that the brake assembly 44 is released (see: "BRAKE SOLENOID VALVE" output, the solenoid valve 64, the brake line pressure sensor 66, and "BREAK LINE PRESSURE" input shown in FIG. 3). Then, step 612 is determining, using data from the thermometer 60, if the ambient air temperature is above a predetermined snow accumulation temperature value (e.g., 35 degrees F.). If not, then step 614 is determining if the wind turbine system 52 has been in the stand-by mode for less than a predetermined snow accumulation time period (e.g., two hours). If not, then step 616 is going to a snow removal routine, as described below. If either the ambient air temperature is above the predetermined snow accumulation temperature value or the wind turbine system 52 has been in the stand-by mode for less than the predetermined snow accumulation time period, then step 618 is going to a Tip Speed Ratio ("TSR") routine, as described below. Step 618, going to the TSR routine, is also executed upon return from the snow removal routine.

Figure 7:
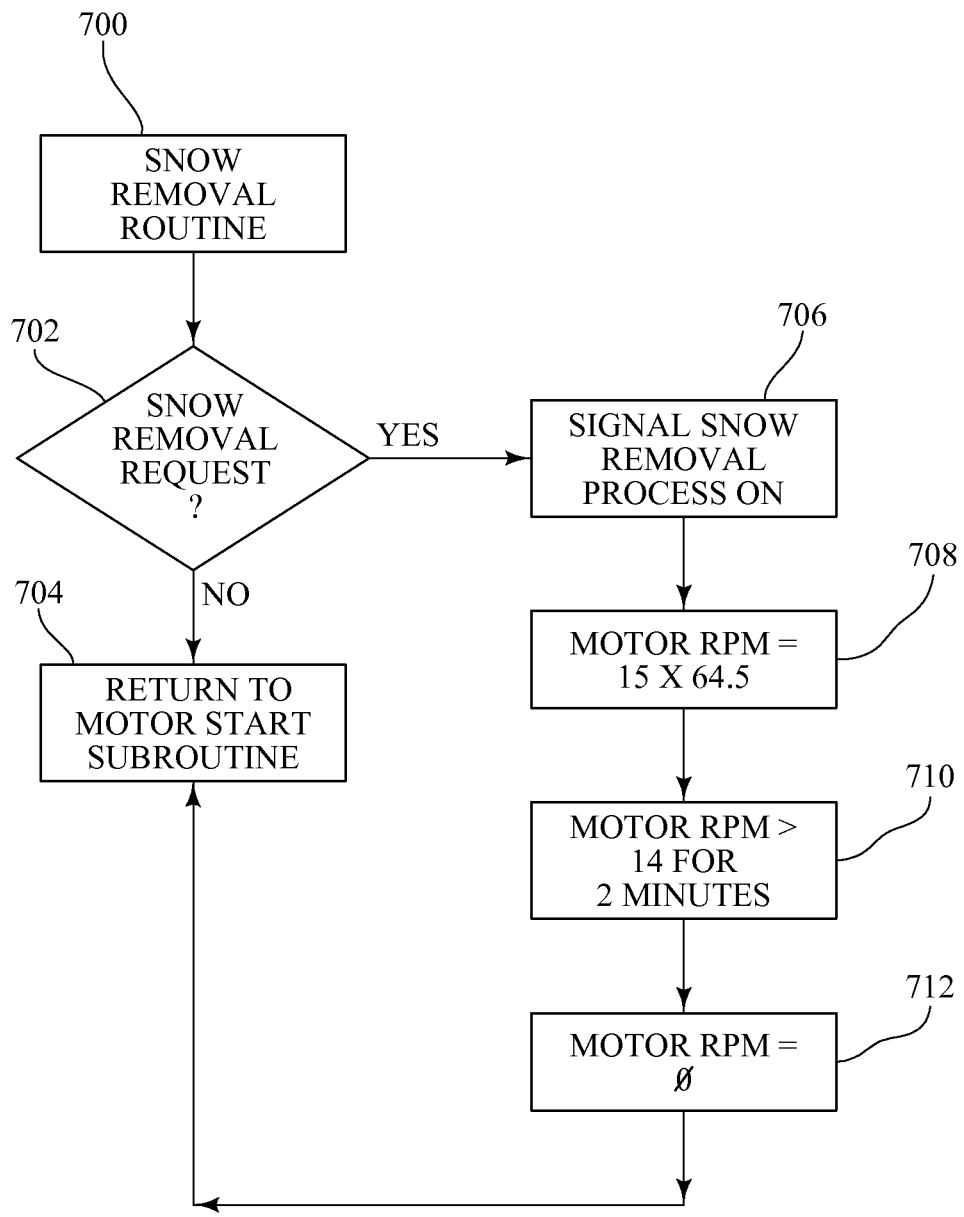

FIG. 7 is a flow chart of steps executed by the snow removal routine or module 700 of computer-readable instructions executed by the processing device 80. Step 702 is determining whether a user, via the user interface 84, has requested snow removal. This optional step allows the user to by-pass the snow removal steps if desired, such as if no snow is present. If the processing device 80 determines that snow removal has not been requested, then step 704 is returning to motor start routine 600. If the processing device 80 determines that snow removal has been requested, or if the wind turbine system 52 is operated without the snow removal by-pass option, then step 706 is signaling, via the user interface 84, that the snow removal process is "on." Then, step 708 is sending a predetermined snow removal command speed (e.g., 15 RPM×64.5) to the variable-speed drive 54 to turn the sail assembly 18 via the motor/generator 50. It is assumed that the variable-speed drive 54 includes a function to "ramp" the speed of the motor/generator 50 up and down, but it is noted that such a "ramp function" could also be implemented by the industrial process controller 56. Step 710 is maintaining the speed of the motor/generator 50 above a predetermined minimum snow removal speed (e.g., 14 RPM) for a predetermined minimum show removal time (e.g., two minutes). In the exemplary embodiment, it was determined that a motor RPM of greater than 14 rpm for two minutes was adequate to "slough-off" any accumulated snow. Then, step 712 is setting the motor RPM to zero (i.e., stopped). Then, step 704, returning to the motor start routine 600, is implemented.

Figure 8:
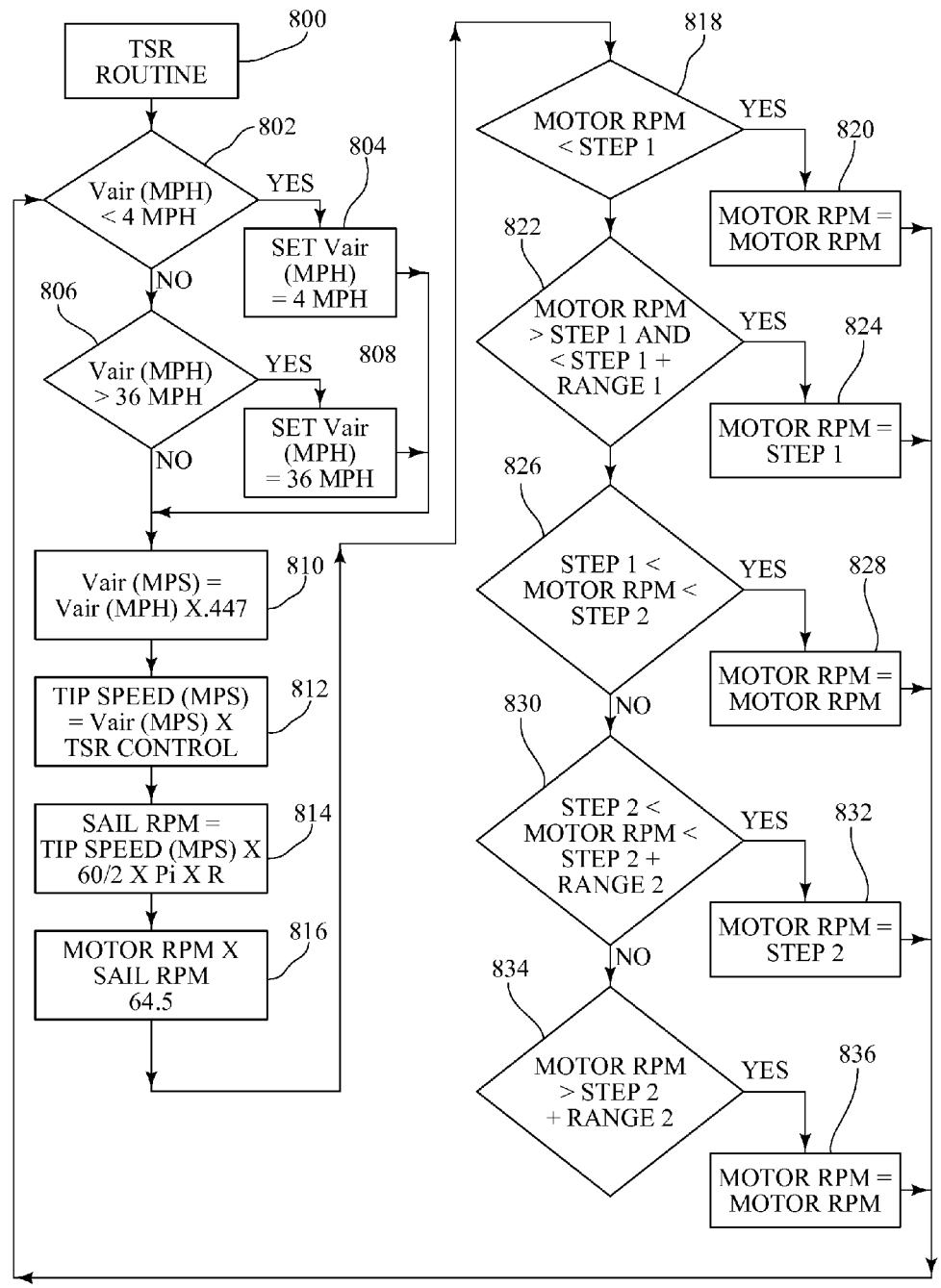

FIG. 8 is a flow chart of steps executed by the Tip Speed Ratio ("TSR") routine or module 800 of computer-readable instructions executed by the processing device 80. Table 1, below, is a list of equations for the TSR routine 800. Step 802 is determining if the actual wind speed value (Vair(MPH)) received from the anemometer 58 is less than a minimum wind speed value (e.g., 4 MPH). If so, step 804 is setting a parameter Vair(MPH) to the minimum wind speed value. In this manner, a minimum rotation speed of the sail 38 is set and the variable-speed drive 54 will operate in "drive mode" to drive the motor/generator 50 to turn the sail 38 if the actual wind speed value is less than that required to turn the sail 38 at the minimum wind speed value. Step 806 is determining if the actual wind speed value (Vair(MPH)) is greater than a maximum wind speed value (e.g., 36 MPH). If so, step 808 is setting the parameter Vair(MPH) to the maximum wind speed value. Thus, to prevent centrifugal force from becoming too high, a maximum rotational speed of the sail 38 is set and the variable-speed drive 54 and the motor/generator 50 will operate in "braking mode" to prevent the sail 38 from turning faster than the maximum rotational speed. Otherwise, the actual Vair (MPH) is used. Steps 810-816 are calculating a motor RPM for the variable-speed drive 54 and the motor/generator 50 based on the Vair (MPH) speed. In normal operation, the motor RPM is set such that the variable-speed drive 54 and the motor/generator 50 will operate in "braking mode" to generate power in an efficient manner.

TABLE 1

| Equations |
|---|
| Tk = Tc + 273.15 |
| Tc = (Tf − 32) * (5/8) |
| Vair (mps) = Vair (MPH) * 0.447 |
| Tip Speed (mps) = 2 * pi * R * Sail RPM/60 |

TABLE 1-continued

| Equations |
|---|
| Motor RPM = Sail RPM * 64.5 (gear ratio) |
| TSR = Tip Speed/Vair |
| Power (Watts) = 0.5 * Hs * Wrk * Dair * (Vair)**3 |
| Power (kwh) = Power (Watts) * 3.6 (assumes process cycle is one second) |
| Dair (kg/m3) – P/(Rc * Tk) |
| TSR Control = A + B * Vair + C * Vair**2 |
| R = 2.0 |
| Pi = 3.14 |
| Hs = 6.0 |
| Ws = 4.0 |
| P = 101325 (pascals) |
| Rc = 287.05 |
| Step X = Max Motor RPM before step |
| Range X = Range of RPM to avoid above step |

Table 2, below, is a table of power output calculations for a turbine at varying wind speeds, efficiencies, and size. The tip speed of the sail is always less than the speed of the wind (i.e., the TSR is always less than 1.0).

TABLE 2

POWER OUTPUT CALCULATIONS FOR A TURBINE AT VARYING WIND SPEEDS, EFFICIENCIES, AND SIZE

| | | | | | | Cut in Speed 8 Gear Ratio 64.5 | | A = 0.75 | |
| --- | --- | --- | --- | --- | --- | --- | --- | --- | --- |
| | Turbine Size in Sq M 24 | | Width 4 | | | | Tip Speed | B = 0.005 | |
| V (m/s) | Total Theoretical Watts | Total Turbine Watts | Absolute Efficiency 18% | Height 6 20% | 22% | V (mph) | equals Wind Speed RPM | TSR | C = 0 Platten RPM | Motor RPM |
| 1.0 | 0.6 | 15 | 3 | 3 | 3 | 2 | 5 | 0.739 | 3.5 | 228 |
| 1.5 | 2.1 | 51 | 9 | 10 | 11 | 3 | 7 | 0.733 | 5.3 | 339 |
| 2.0 | 5.0 | 120 | 22 | 24 | 26 | 4 | 10 | 0.728 | 7.0 | 448 |
| 2.5 | 9.7 | 234 | 42 | 47 | 51 | 6 | 12 | 0.722 | 8.6 | 556 |
| 3.0 | 16.8 | 404 | 73 | 81 | 89 | 7 | 14 | 0.716 | 10.3 | 662 |
| 3.5 | 26.7 | 642 | 116 | 128 | 141 | 8 | 17 | 0.711 | 11.9 | 767 |
| 4.0 | 39.9 | 958 | 172 | 192 | 211 | 9 | 19 | 0.705 | 13.5 | 869 |
| 4.5 | 56.8 | 1364 | 246 | 273 | 300 | 10 | 21 | 0.700 | 15.0 | 970 |
| 5.0 | 78.0 | 1871 | 337 | 374 | 412 | 11 | 24 | 0.694 | 16.6 | 1069 |
| 5.5 | 103.8 | 2491 | 448 | 498 | 548 | 12 | 26 | 0.688 | 18.1 | 1167 |
| 6.0 | 134.7 | 3234 | 582 | 647 | 711 | 13 | 29 | 0.683 | 19.6 | 1262 |
| 6.5 | 171.3 | 4111 | 740 | 822 | 904 | 15 | 31 | 0.677 | 21.0 | 1356 |
| 7.0 | 213.9 | 5135 | 924 | 1027 | 1130 | 16 | 33 | 0.672 | 22.5 | 1449 |
| 7.5 | 263.1 | 6315 | 1137 | 1263 | 1389 | 17 | 36 | 0.666 | 23.9 | 1539 |
| 8.0 | 319.4 | 7665 | 1380 | 1533 | 1686 | 18 | 38 | 0.661 | 25.2 | 1628 |
| 8.5 | 383.1 | 9193 | 1655 | 1839 | 2023 | 19 | 41 | 0.655 | 26.6 | 1715 |
| 9.0 | 454.7 | 10913 | 1964 | 2183 | 2401 | 20 | 43 | 0.649 | 27.9 | 1801 |
| 9.5 | 534.8 | 12835 | 2310 | 2567 | 2824 | 21 | 45 | 0.644 | 29.2 | 1884 |
| 10.0 | 623.8 | 14970 | 2695 | 2994 | 3293 | 22 | 48 | 0.638 | 30.5 | 1966 |
| 10.5 | 722.1 | 17330 | 3119 | 3466 | 3813 | 23 | 50 | 0.633 | 31.7 | 2046 |
| 11.0 | 830.2 | 19925 | 3587 | 3985 | 4384 | 25 | 53 | 0.627 | 32.9 | 2125 |
| 11.5 | 948.6 | 22767 | 4098 | 4553 | 5009 | 26 | 55 | 0.621 | 34.1 | 2202 |
| 12.0 | 1077.8 | 25868 | 4656 | 5174 | 5691 | 27 | 57 | 0.616 | 35.3 | 2277 |
| 12.5 | 1218.3 | 29238 | 5263 | 5848 | 6432 | 28 | 60 | 0.610 | 36.4 | 2350 |
| 13.0 | 1370.4 | 32889 | 5920 | 6578 | 7236 | 29 | 62 | 0.605 | 37.5 | 2422 |
| 13.5 | 1534.7 | 36832 | 6630 | 7366 | 8103 | 30 | 64 | 0.599 | 38.6 | 2492 |
| 14.0 | 1711.6 | 41078 | 7394 | 8216 | 9037 | 31 | 67 | 0.593 | 39.7 | 2560 |
| 14.5 | 1901.6 | 45638 | 8215 | 9128 | 10040 | 32 | 69 | 0.588 | 40.7 | 2626 |
| 15.0 | 2105.2 | 50524 | 9094 | 10105 | 11115 | 34 | 72 | 0.582 | 41.7 | 2691 |
| 15.5 | 2322.8 | 55746 | 10034 | 11149 | 12264 | 35 | 74 | 0.577 | 42.7 | 2754 |
| 16.0 | 2554.9 | 61317 | 11037 | 12263 | 13490 | 36 | 76 | 0.571 | 43.6 | 2815 |
| 16.5 | 2802.0 | 67247 | 12104 | 13449 | 14794 | 37 | 79 | 0.565 | 44.6 | 2875 |
| 17.0 | 3064.5 | 73548 | 13239 | 14710 | 16180 | 38 | 81 | 0.560 | 45.5 | 2933 |
| 17.5 | 3342.9 | 80230 | 14441 | 16046 | 17651 | 39 | 84 | 0.554 | 46.3 | 2989 |
| 18.0 | 3637.7 | 87305 | 15715 | 17461 | 19207 | 40 | 86 | 0.549 | 47.2 | 3043 |
| 18.5 | 3949.4 | 94784 | 17061 | 18957 | 20853 | 41 | 88 | 0.543 | 48.0 | 3096 |
| 19.0 | 4278.3 | 102679 | 18482 | 20536 | 22589 | 43 | 91 | 0.537 | 48.8 | 3147 |
| 19.5 | 4625.0 | 111001 | 19980 | 22200 | 24420 | 44 | 93 | 0.532 | 49.5 | 3196 |
| 20.0 | 4990.0 | 119760 | 21557 | 23952 | 26347 | 45 | 96 | 0.526 | 50.3 | 3243 |

Figure 9:
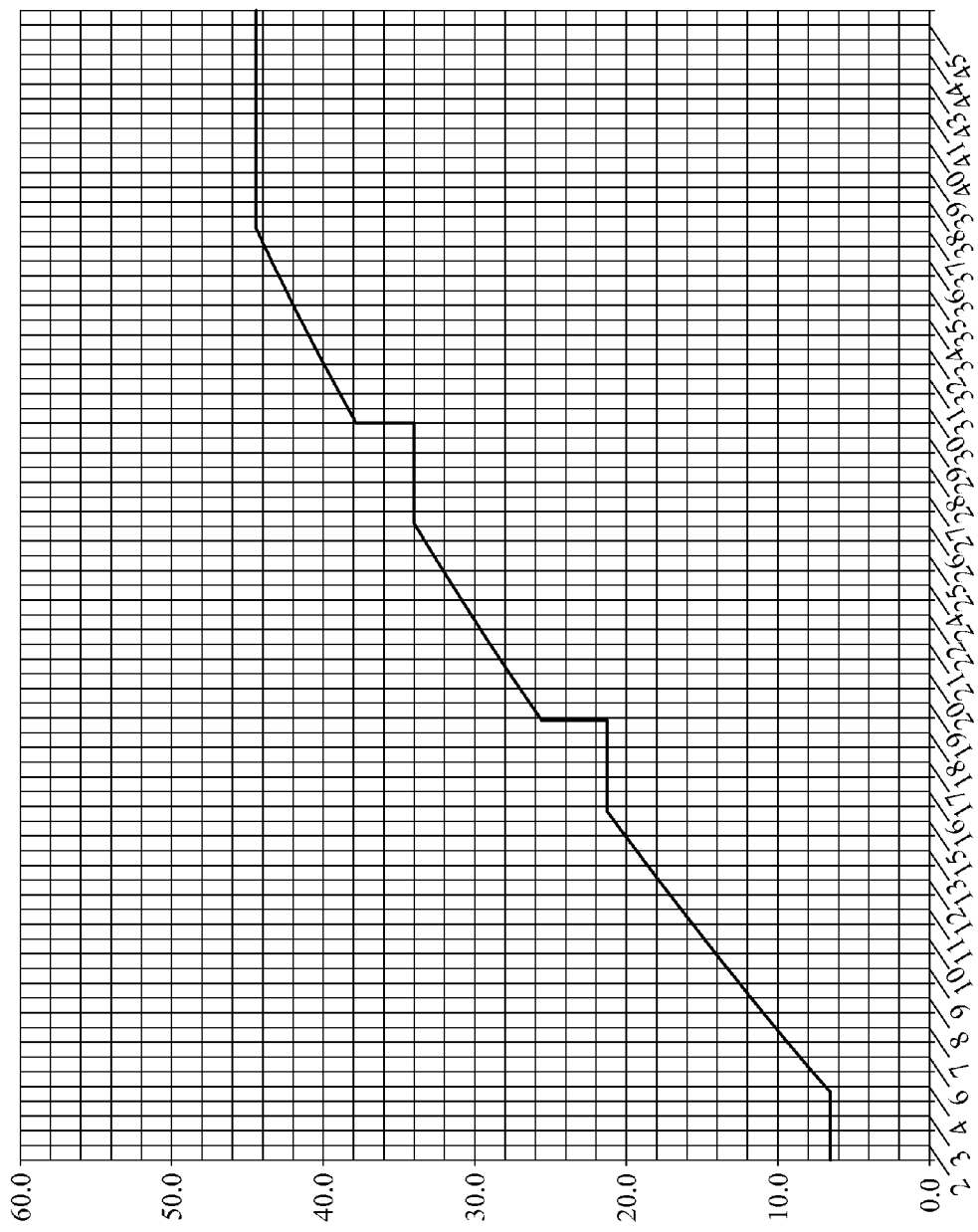
FIG. 9 is a graph illustrating the tip speed of the sail vs. the speed of the wind as implemented by the TSR subroutine of the exemplary embodiment of the invention.

FIG. 9 is a graph illustrating the tip speed of the sail vs. the speed of the wind as implemented by the TSR subroutine. As shown, a low-speed value and a high-speed value serve as limits on the motor RPM (command speed) that will be sent to the variable-speed drive 54.

Returning now to FIG. 8, the TSR subroutine 800 also accounts for concerns with respect to harmonic frequency ranges that could damage a building or support structure upon which the wind turbine 10 is mounted. The harmonic frequency ranges must be determined by an engineering study of the building or support structure, but once determined, the TSR subroutine will avoid those ranges as described hereinafter. In the exemplary embodiment described herein: Step 1 is defined as the maximum motor RPM before the lower end of a first harmonic frequency range; Range 1 is defined as the range of RPM to avoid above Step 1, or the magnitude of the first harmonic frequency range; Step 2 is defined as the maximum motor RPM before the lower end of a second harmonic frequency range; and Range 2 is defined as the range of RPM to avoid above Step 2, or the magnitude of the second harmonic frequency range. Step 818 is determining if the calculated motor RPM from step 816 is less than Step 1. If so, then step 820 is setting the output motor RPM to be the calculated motor RPM. Step 822 is determining if the calculated motor RPM is greater than Step 1 but less than Step 1 plus Range 1. If so, then step 824 is setting the output motor RPM to be Step 1 (i.e., holds the output motor RPM at the maximum motor RPM before the lower end of the first harmonic range). Step 826 is determining if the calculated motor RPM is greater than Step 1 plus Range 1, but less than Step 2. If so, then step 828 is setting the output motor RPM to be the calculated motor RPM. Step 830 is determining if the calculated motor RPM is greater than Step 2 but less than Step 2 plus Range 2. If so, then step 832 is setting the output motor RPM to be Step 2 (i.e., holds the output motor RPM at the maximum motor RPM before the lower end of the second harmonic range). Step 834 is determining if the calculated motor RPM is greater than Step 2 plus Range 2. If so, then step 836 is setting the output motor RPM to be the calculated motor RPM. If more steps are required, they can be added. As shown in FIG. 8, once a output motor RPM is set, the logic returns to step 802, determining if the actual wind speed value received from the anemometer 58 is less than the minimum wind speed value. The results of this logic are illustrated as the step portions in the middle section of the curve of the graph illustrated in FIG. 9. Of course, the logic of the TSR routine 800 is always subject to being interrupted by the motor stop routine, as described below.

Returning now to FIG. 5, following step 504, going to the motor start routine, which starts rotation of motor/generator 50 and the sail assembly 18, step 506 is determining whether the five-minute wind speed average is less than a predetermined stop value (e.g., 6 MPH). If not, then step 508 is determining whether the user has requested a change to the stand-by mode. If not, then the logic returns to step 506, determining whether the five-minute wind speed average is less than the predetermined stop value. If the five-minute wind speed average is less than the predetermined stop value or if the user has requested a change to stand-by mode, then step 510 is going to the motor stop routine, as described below. Upon return from the motor stop routine, step 512 is again determining whether the user has requested a change to the stand-by mode. If so, then step 514 is going to the stand-by mode, as described above. However, if the user has not requested a change to the stand-by mode and the motor stop routine was called only because the five-minute wind speed average was less than the predetermined stop value, then the economy mode routine 500 returns to step 502, determining whether the five-minute wind speed average is greater than the predetermined start value. Then, the execution of instructions will not proceed until the five-minute wind speed average is greater than the predetermined start value.

Figure 10:
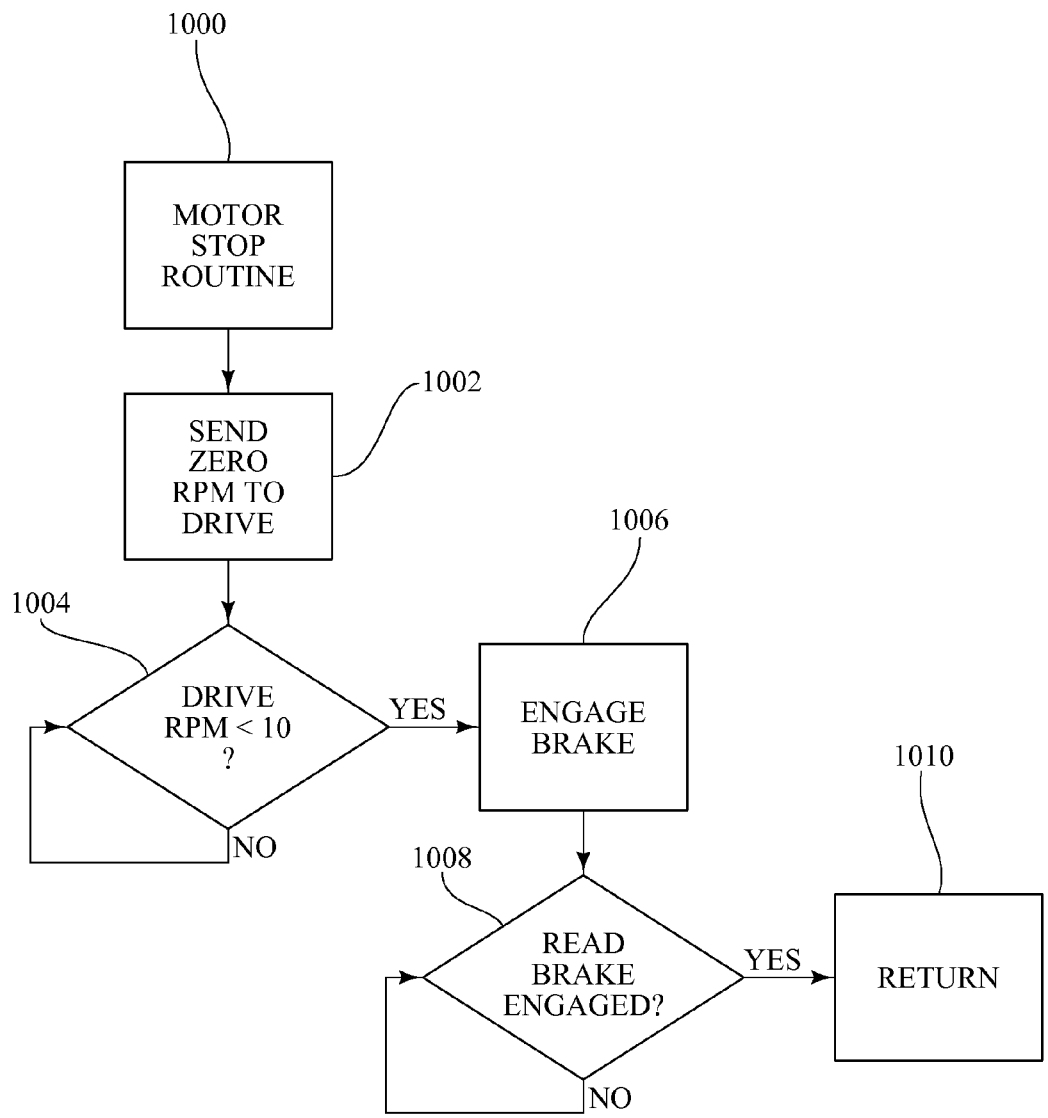
FIGS. 10-11 also show an exemplary flow of a control logic of an exemplary industrial process controller in accordance with the present invention.

FIG. 10 is a flow chart of steps executed by the motor stop routine or module 1000 of computer-readable instructions executed by the processing device 80. Step 1002 is setting the output motor RPM (i.e., the command speed) to zero RPM, which will cause the variable-speed drive 54 to begin ramping the motor RPM to zero. Step 1004 is determining whether the RPM of the motor/generator 50 is less than a predetermined braking value (e.g., 10 RPM). If not, then the execution of instructions will not proceed until the RPM of the motor/generator 50 is less than the predetermined braking value. However, if the RPM of the motor/generator 50 is less than the predetermined braking value, then step 1006 is applying the braking force of the brake assembly 44, and step 1008 is reading that the brake assembly 44 is applied (see: "BRAKE SOLENOID VALVE" output, the solenoid valve 64, the brake line pressure sensor 66, and "BREAK LINE PRESSURE" input shown in FIG. 3). Step 1010 is returning to the routine that called the motor stop routine 1000.

Figure 11:
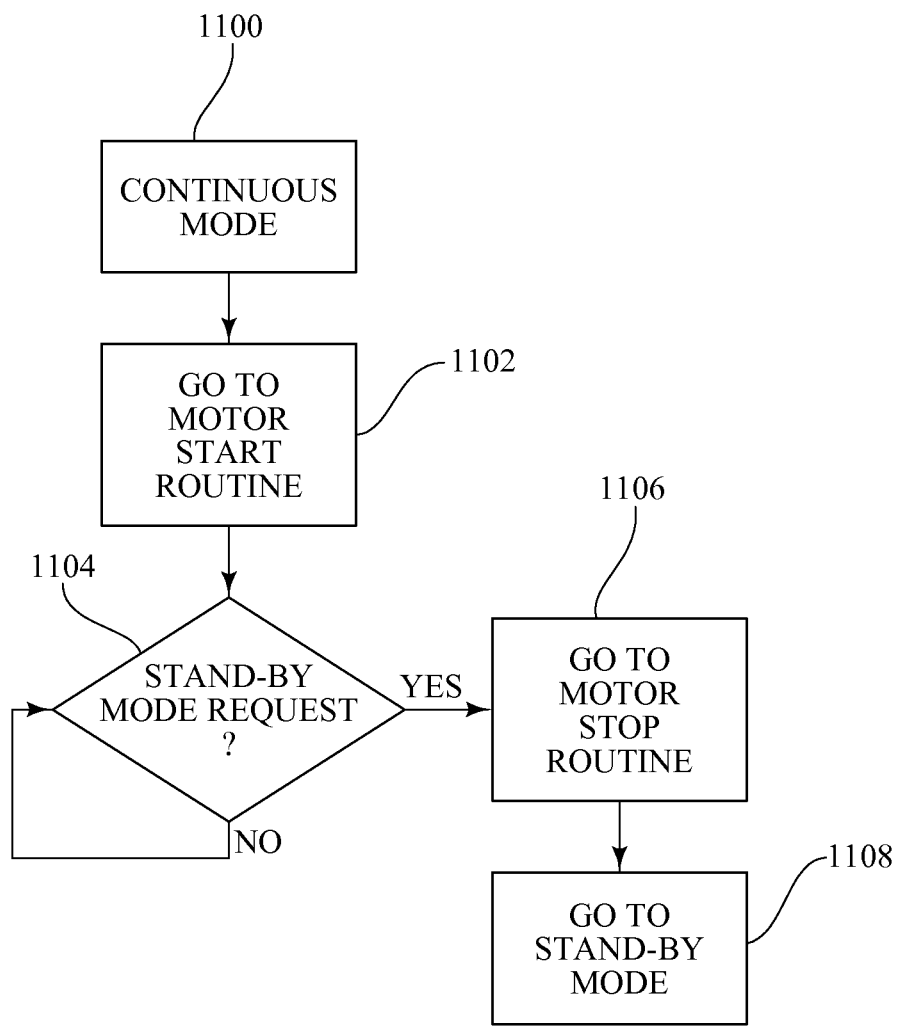

FIG. 11 is a flow chart of steps executed by the continuous mode routine or module 1100 of computer-readable instructions executed by the processing device 80. Step 1102 is going to the motor start routine, as described above. Then, step 1104 is determining whether the user has requested a change to the stand-by mode. If not, then the continuous mode routine merely waits for the user to request a change to the stand-by mode, while the wind turbine 10 continues to operate. Thus, the sail assembly 18 continues to turn at least at the minimum rotation speed even if the wind stops all together, in order to provide a visual effect. With the addition of advertising or other indicia, the sail assembly 18 thereby functions as a revolving sign and, when the wind speed is adequate, as a power generator returning power to the power system. If it is determined in step 1104 that the user has requested a change to the stand-by mode, then step 1106 is going to the motor stop routine 1000, as described above. Then step 1108 is going to the stand-by mode routine 400, as also described above.

What is claimed is:

1. A method of operating a wind turbine system comprising:
    determining, by an industrial process controller, if an actual wind speed value, received from an anemometer, of a wind at a location of the wind turbine system is less than a predetermined minimum wind speed value;
    if so, then calculating a command speed value that will cause a variable-speed drive in communication with a motor/generator of the wind turbine system to drive the motor/generator and a sail assembly attached to the motor/generator at a speed that the sail assembly would turn if the actual wind speed value was the minimum wind speed value, such that the sail assembly turns and provides a visual effect; and
    if not, then calculating a command speed value based on the actual wind speed value such that the variable-speed drive and the motor/generator will operate in a braking mode to recover a braking energy of a load of the wind on the sail assembly; and
    sending the command speed value to the variable-speed drive.

2. The method of operating a wind turbine system of claim 1, wherein the step of calculating a command speed based on the actual wind speed value further comprises:

defining a range of command speed values that will cause the motor/generator and sail assembly to turn at a range of speeds that cause harmonic frequencies in a structure supporting the motor/generator and the sail assembly; and if the calculated command speed value falls in the defined range, then setting the command speed value to a speed below the defined range.

3. The method of operating a wind turbine system of claim 1, further comprising:

before determining if the actual wind speed value is less than the predetermined minimum wind speed value, determining, by the industrial process controller, that an ambient air temperature value, received from a thermometer, of air at the location of the wind turbine system is less than a predetermined snow accumulation air temperature value, and that the wind turbine system has been in a stand-by mode of no operation for more than a predetermined snow accumulation time period, then,
sending a predetermined snow removal command speed value to the variable-speed drive to turn the sail assembly via the motor/generator;
maintaining a speed of the motor/generator above a predetermined minimum snow removal speed for a predetermined minimum snow removal time; and
sending a command speed value of zero to stop the motor/generator and the sail assembly.

4. The method of operating a wind turbine system of claim 1, wherein power produced by the motor/generator has a form of a variable frequency AC signal, the method further comprising:

inputting the variable frequency AC signal into a rectifier to produce a rectified signal;
inputting the rectified signal into an AC-to-DC converter to produce a DC signal;
inputting the DC signal into an isolation transformer to produce a transformed DC signal having a voltage above zero volts; and
inputting the transformed DC signal into a photo-voltaic inverter to produce an AC power signal that can be returned to a power system.

5. The method of operating a wind turbine system of claim 1, further comprising:

before determining if the actual wind speed value is less than the predetermined minimum wind speed value, entering a stand-by mode of no operation;
determining, by the industrial process controller, that there are no system fault or trip alarms for the wind turbine system;
determining that the wind turbine system has been powered up for more than a predetermined startup time period;
entering one of an economy mode or a continuous mode of operation;
enabling the variable-speed drive and reading that the variable-speed drive is enabled;
releasing a brake assembly applying a braking force on rotation of the sail assembly, and reading that the brake assembly is released;
wherein the economy mode comprises,
determining that an average wind speed value over a predetermined monitoring period exceeds a predetermined start value before enabling the variable-speed drive, and
upon determining that the average wind speed value over the predetermined monitoring period is less than a predetermined stop value, overriding the calculated command speed value to stop rotation of the sail assembly, engaging the brake assembly, and reading that the brake assembly is engaged;
wherein the continuous mode of operation comprises operating the wind turbine system until a request is received to go to the stand-by mode.

6. A method of operating a wind turbine system comprising:

determining, by an industrial process controller, that an ambient air temperature value, received from a thermometer, of air at a location of the wind turbine system is less than a predetermined snow accumulation air temperature value, and that the wind turbine system has been in a stand-by mode of no operation for more than a predetermined snow accumulation time period, then
sending a predetermined snow removal command speed value to a variable-speed drive in communication with a motor/generator of the wind turbine system to drive the motor/generator and a sail assembly attached to the motor/generator to turn the sail assembly via the motor/generator;
maintaining a speed of the motor/generator above a predetermined minimum snow removal speed for a predetermined minimum snow removal time; and
sending a command speed value of zero to stop the variable-speed drive to stop turning the sail assembly via the motor/generator.

7. The method of operating a wind turbine system of claim 6, further comprising:

determining, by the industrial process controller, if an actual wind speed value, received from an anemometer, of a wind at the location of the wind turbine system is less than a predetermined minimum wind speed value,
if so, then calculating a command speed value that will cause the variable-speed drive to drive the motor/generator and the sail assembly at a speed that the sail assembly would turn if the actual wind speed value was the minimum wind speed value, such that the sail assembly turns and provides a visual effect; and
if not, then calculating a command speed value based on the actual wind speed value such that the variable-speed drive and the motor/generator will operate in a braking mode to recover a braking energy of a load of the wind on the sail assembly; and
sending the command speed value to the variable-speed drive.

8. The method of operating a wind turbine system of claim 7, wherein the step of calculating a command speed based on the actual wind speed value further comprises:

defining a range of command speed values that will cause the motor/generator and sail assembly to turn at a range of speeds that cause harmonic frequencies in a structure supporting the motor/generator and the sail assembly; and if the calculated command speed value falls in the defined range, then setting the command speed value to a speed below the defined range.

9. The method of operating a wind turbine system of claim 8, wherein power produced by the motor/generator has a form of a variable frequency AC signal, the method further comprising:

inputting the variable frequency AC signal into a rectifier to produce a rectified signal;
inputting the rectified signal into an AC-to-DC converter to produce a DC signal;
inputting the DC signal into an isolation transformer to produce a transformed DC signal having a voltage above zero volts; and inputting the transformed DC signal into a photo-voltaic inverter to produce an AC power signal that can be returned to a power system.

10. A wind turbine system comprising:
a motor/generator;
a variable-speed drive operably connected to the motor/generator;
a sail assembly mounted to a shaft, the shaft operably connected to the motor/generator;
an anemometer for measuring an actual wind speed value of a wind at a location of the sail assembly;
an industrial process controller including a data storage device, a processing device in communication with the data storage device, and an input/output (I/O) interface device in communication with the processing device, the variable-speed drive, and the anemometer, the data storage device including computer-readable instructions for execution by the processing device to cause the industrial process controller to determine if the actual wind speed value is less than a predetermined minimum wind speed value,
if so, then to calculate a command speed value that will cause the variable-speed drive to drive the motor/generator and the sail assembly attached to the motor/generator at a speed that the sail assembly would turn if the actual wind speed value was the minimum wind speed value, such that the sail assembly turns and provides a visual effect, and
if not, then to calculate a command speed value based on the actual wind speed value such that the variable-speed drive and the motor/generator will operate in a braking mode to recover a braking energy of a load of the wind on the sail assembly; and
send the command speed value to the variable-speed drive.

11. The wind turbine system of claim 10, wherein the computer-readable instructions include a range of command speed values that will cause the motor/generator and sail assembly to turn at a range of speeds that cause harmonic frequencies in a structure supporting the motor/generator and the sail assembly, wherein the computer-readable instructions cause the processing device to determine if the calculated command speed value falls in the defined range, and, if so, to set the command speed value to a speed below the defined range.

12. The wind turbine system of claim 10, further comprising:
a thermometer for measuring a temperature value at the location of the sail assembly, the thermometer in communication with the I/O interface device; and
computer-readable instructions for execution by the processing device to cause the industrial process controller to
before determining if the actual wind speed value is less than the predetermined minimum wind speed value, determine that an ambient air temperature value, received from the thermometer is less than a predetermined snow accumulation air temperature value, and that the wind turbine system has been in a stand-by mode of no operation for more than a predetermined snow accumulation time period;
send a predetermined snow removal command speed value to the variable-speed drive to turn the sail assembly via the motor/generator;
maintain a speed of the motor/generator above a predetermined minimum snow removal speed for a predetermined minimum snow removal time; and
send a command speed value of zero to stop the motor/generator and the sail assembly.

13. The wind turbine system of claim 10, further comprising:
a rectifier for receiving a generated variable frequency AC signal produced by the motor/generator, and producing a rectified signal;
an AC-to-DC converter receiving the rectified signal and producing a DC signal;
an isolation transformer receiving the DC signal and producing a transformed DC signal having a voltage above zero volts; and
a photo-voltaic inverter receiving the transformed DC signal and producing an AC power signal that can be returned to a power system.

14. The wind turbine system of claim 10, further comprising:
a brake assembly applying a braking force on rotation of the sail assembly;
computer-readable instructions for execution by the processing device to cause the industrial process controller to
before determining if the actual wind speed value is less than the predetermined minimum wind speed value, enter a stand-by mode of no operation,
determine that there are no system fault or trip alarms for the wind turbine system,
determine that the wind turbine system has been powered up for more than a predetermined startup time period,
enter one of an economy mode or a continuous mode of operation,
enable the variable-speed drive and read that the variable-speed drive is enabled,
release the brake assembly, and read that the brake assembly is released;
when in the economy mode, the computer-readable instructions cause the industrial process controller to
determine that an average wind speed value over a predetermined monitoring period exceeds a predetermined start value before enabling the variable-speed drive, and
upon determining that the average wind speed value over the predetermined monitoring period is less than a predetermined stop value, override the calculated command speed value to stop rotation of the sail assembly, engage the brake assembly, and read that the brake assembly is engaged; and
when in the continuous mode, the computer-readable instructions cause the industrial process controller to operate the wind turbine system until a request is received to go to the stand-by mode.

* * * * *